US012388344B2

(12) United States Patent
Du et al.

(10) Patent No.: US 12,388,344 B2
(45) Date of Patent: Aug. 12, 2025

(54) CURRENT-LIMITING CONTROL STRATEGY FOR SINGLE-LOOP DROOP-CONTROLLED GRID-FORMING INVERTERS

(71) Applicant: BATTELLE MEMORIAL INSTITUTE, Richland, WA (US)

(72) Inventors: Wei Du, Richland, WA (US); Yuan Liu, Richland, WA (US); Quan Nguyen, Richland, WA (US); Sheik Mohammad Mohiuddin, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 242 days.

(21) Appl. No.: 18/241,739

(22) Filed: Sep. 1, 2023

(65) Prior Publication Data
US 2024/0079947 A1    Mar. 7, 2024

Related U.S. Application Data

(60) Provisional application No. 63/404,060, filed on Sep. 6, 2022.

(51) Int. Cl.
*H02M 1/00* (2007.01)
*H02M 1/32* (2007.01)
*H02M 7/5395* (2006.01)

(52) U.S. Cl.
CPC ....... *H02M 1/0019* (2021.05); *H02M 1/0009* (2021.05); *H02M 1/0012* (2021.05); *H02M 1/32* (2013.01); *H02M 7/5395* (2013.01)

(58) Field of Classification Search
CPC ............. H02M 1/0009; H02M 1/0012; H02M 1/0019; H02M 1/32; H02M 7/5395
(Continued)

(56) References Cited

U.S. PATENT DOCUMENTS

| 5,798,633 A | 8/1998 | Larsen et al. |
| 7,577,006 B2 | 8/2009 | Neacsu |
| (Continued) | | |

FOREIGN PATENT DOCUMENTS

EP    1193852    9/2006

OTHER PUBLICATIONS

Du, Wei, "A Current Limiting Method for Single-Loop Voltage-Magnitude Controlled Grid-Forming Converters During Symmetrical Faults", 2022 IEEE Energy Conversion Congress and Exposition (ECCE), Sep. 2022, 7 pages.
(Continued)

*Primary Examiner* — Yemane Mehari
(74) *Attorney, Agent, or Firm* — Colby Nipper PLLC

(57) ABSTRACT

This document describes systems and techniques for a current-limiting control strategy for single-loop droop-controlled grid-forming inverters. In aspects, a hysteresis module is configured to compare an output current detected across one or more transistors in an inverter controlled by the single-loop droop converter with a specified maximum current and to generate an overcurrent signal. The overcurrent signal presents a fault signal responsive to the output current exceeding the specified maximum current. A logic array is configured to logically combine gate control signals generated by the single-loop droop controller to selectively direct the one or more transistors to allow the output current to flow therethrough with the overcurrent signal to present modified gate control signals to the one or more transistors. The logic array is configured to replace one or more of the gate control signals in the modified gate control signals with a gate disable signal responsive to the overcurrent signal presenting the fault signal.

20 Claims, 7 Drawing Sheets

(58) Field of Classification Search
USPC .......................................................... 363/131
See application file for complete search history.

(56) References Cited

U.S. PATENT DOCUMENTS

| | | | |
|---|---|---|---|
| 9,837,931 | B2 | 12/2017 | Luo et al. |
| 9,887,547 | B2* | 2/2018 | Liu .......................... H02M 7/42 |
| 10,079,556 | B2 | 9/2018 | Ichikawa et al. |
| 10,756,536 | B2 | 8/2020 | Kral et al. |
| 10,879,785 | B2* | 12/2020 | Shuai .................. H02M 7/5387 |
| 2005/0030045 | A1* | 2/2005 | Deng ...................... G01R 31/52 |
| | | | 324/522 |
| 2018/0145582 | A1* | 5/2018 | Shuai ...................... H02M 1/32 |
| 2024/0275269 | A1* | 8/2024 | Du .......................... H02M 1/32 |

OTHER PUBLICATIONS

Du, et al., "A Two-Stage Current Limiting Control Strategy for Improved Low-Voltage Ride-Through Capability of Direct-Droop-Controlled, Grid-Forming Inverters", 2023 IEEE Energy Conversion Congress and Exposition (ECCE), USA., Oct. 2023, 5 pages.

Jin, et al., "A DQ-Frame Asymmetrical Virtual Impedance Control for Enhancing Transient Stability of Grid-Forming Inverters", IEEE Transactions on Power Electronics, vol. 37, No. 4, Nov. 2021, 10 pages.

Qoria, et al., "Critical Clearing Time and Enhancement of Grid-Forming Converters Embedding Virtual Impedance as Current Limitation Algorithm", IEEE Transactions on Power Systems, vol. 37, No. 2, Dec. 2019, 10 pages.

Rokrok, et al., "Transient Stability Assessment and Enhancement of Grid-Forming Converters Embedding Current Reference Saturation as Current Limiting Strategy", IEEE Transactions on Power Systems, vol. 37, No. 2, Aug. 2021, 12 pages.

Teng, et al., "A Current Limiting Method for Single-Loop Voltage-Magnitude Controlled Grid-Forming Converters During Symmetrical Faults", IEEE Transactions on Power Electronics, vol. 37, No. 4, Oct. 2021, 13 pages.

Xin, et al., "Synchronous Instability Mechanism of P-f Droop-Controlled Voltage Source Converter Caused by Current Saturation", IEEE Transactions on Power Systems, vol. 31, No. 6, Feb. 2016, 2 pages.

Ajala, et al., "Model Reduction for Inverters with Current Limiting and Dispatchable Virtual Oscillator Control", May 21, 2021, 11 pages.

Crivellaro, et al., "Beyond low-inertia systems: Massive integration of grid-forming power converters in transmission grids", Nov. 7, 2019, 5 pages.

Du, et al., "A Comparative Study of Two Widely Used Grid-Forming Droop Controls on Microgrid Small-Signal Stability", Sep. 2019, 6 pages.

Du, et al., "Modeling of Grid-Forming and Grid-Following Inverters for Transient Stability Simulation of Large-Scale Distribution Systems", Feb. 2019, 8 pages.

Elkhatib, et al., "Evaluation of Inverter-based Grid Frequency Support using Frequency-Watt and Grid-Forming PV Inverters", Aug. 2018, 5 pages.

Erdocia, et al., "Dual Voltage-Current Control to Provide Grid-Forming Inverters with Current Limiting Capability", Dec. 2021, 12 pages.

Hernandez-Alvidrez, et al., "PV-Inverter Dynamic Model Validation and Comparison Under Fault Scenarios Using a Power Hardware-in-the-Loop Testbed", Nov. 2018, 6 pages.

Huang, et al., "Transient Stability Analysis and Control Design of Droop-Controlled Voltage Source Converters Considering Current Limitation", Sep. 2017, 13 pages.

Lasseter, et al., "Grid-Forming Inverters: A Critical Asset for the Power Grid", Jun. 2020, pp. 925-935.

Paquette, et al., "Virtual Impedance Current Limiting for Inverters in Microgrids with Synchronous Generators", Apr. 2015, pp. 1630-1638.

Rosso, et al., "On The Implementation of an FRT Strategy for Grid-Forming Converters Under Symmetrical and Asymmetrical Grid Faults", Jul. 2021, pp. 4385-4397.

Taul, et al., "Current Limiting Control With Enhanced Dynamics of Grid-Forming Converters During Fault Conditions", Jul. 2019, 12 pages.

Wei, et al., "Survivability of Autonomous Microgrid during Overload Events", Apr. 2018, 9 pages.

* cited by examiner

800

Generating a plurality of gate control signals applicable to a plurality of transistors in the grid-forming inverter to cause the grid-forming inverter to generate a plurality of output currents combinable to form an alternating current
802

Comparing a specified maximum current with the plurality of output currents to generate an overcurrent signal, the overcurrent signal presenting a fault signal responsive to one of the plurality of output currents flowing through at least one of the transistors exceeding the specified maximum current
804

Replace one or more of the gate control signals with a gate disable signal responsive to the fault signal being presented
806

Applying the gate disable signal to the at least one of the transistors to prevent the output current from flowing through the at least one of the transistors
808

*FIG. 8*

CURRENT-LIMITING CONTROL STRATEGY FOR SINGLE-LOOP DROOP-CONTROLLED GRID-FORMING INVERTERS

INCORPORATION BY REFERENCE

This application claims the benefit of U.S. Provisional Patent Application No. 63/404,060, filed Sep. 6, 2022, and titled "A CURRENT LIMITING CONTROL STRATEGY FOR SINGLE-LOOP DROOP-CONTROLLED GRID-FORMING INVERTERS UNDER BALANCED AND UNBALANCED FAULTS" (the "Provisional Application"). This application incorporates by reference the entirety of the Provisional Application.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

BACKGROUND

Grid-forming inverters are increasingly used to improve the stability of a power grid by enabling renewable power sources to supply power to the power grid to supplement conventional generating sources. Most renewable sources, such as solar power systems and wind power systems, typically provide sources of direct current (DC) power, either directly or via storage batteries in which the DC power generated is stored for later use. Although power grids operate using alternating current (AC) power, grid-forming inverters convert DC power sources to AC power for supply to the power grid.

To a power grid, a grid-forming inverter fundamentally behaves as a voltage source behind an impedance. A potential disadvantage of the grid-forming inverter is that transistors or other components of grid-forming inverters may be damaged during overcurrent episodes, such as occurrence of short circuits, if protective measures are not used.

Droop control is a widely used technique for managing current flow in a grid-forming inverter to one of most mature grid-forming control strategies. Two common forms of droop-control systems are multi-loop droop-controlled systems and single-loop droop-controlled systems. A multi-loop droop-controlled system typically controls the magnitude and frequency of an inverter filter capacitor voltage according to the droop laws using cascaded inner voltage and current loops to achieve fast control of the filter capacitor voltage. A single-loop droop-controlled system directly controls magnitude and frequency of a modulation waveform according to the droop laws without using a cascaded inner current loop. Multi-loop droop-controlled systems often focus on modifying a current reference of the cascaded inner current loop of multi-loop droop-controlled systems to limit overcurrent episodes, but these methods are not applicable to single-loop droop-controlled structures that do not use a cascaded inner current loop. A single-loop droop-controlled system—as the name may imply—is simpler in structure than a multi-loop droop-controlled system, but a single-loop droop-controlled system may be more vulnerable to overcurrent episodes than multi-loop droop-controlled systems.

SUMMARY

This document describes systems and techniques for a current-limiting control strategy for single-loop droop-controlled grid-forming inverters. In aspects, a hysteresis module is configured to compare an output current detected across one or more transistors in an inverter controlled by the single-loop droop converter with a specified maximum current and to generate an overcurrent signal. The overcurrent signal presents a fault signal responsive to the output current exceeding the specified maximum current. A logic array is configured to logically combine gate control signals generated by the single-loop droop controller to selectively direct the one or more transistors to allow the output current to flow therethrough with the overcurrent signal to present modified gate control signals to the one or more transistors. The logic array is configured to replace one or more of the gate control signals in the modified gate control signals with a gate disable signal responsive to the overcurrent signal presenting the fault signal.

This Summary introduces simplified concepts related to systems and techniques for a current-limiting control strategy for single-loop droop-controlled grid-forming inverters, as further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques for a current-limiting control strategy for single-loop droop-controlled grid-forming inverters are described in this document with reference to the following drawings, wherein the same numbers are used throughout the drawings to reference like features and components:

FIG. 8 is a flow diagram of an example method of limiting current across one or more transistors in a grid-forming inverter.

DETAILED DESCRIPTION

Overview

This document describes systems and techniques for a current-limiting control strategy for single-loop droop-controlled grid-forming inverters. In aspects, a hysteresis module is configured to compare an output current detected across one or more transistors in an inverter controlled by the single-loop droop converter with a specified maximum current and to generate an overcurrent signal. The overcurrent signal presents a fault signal responsive to the output current exceeding the specified maximum current. A logic array is configured to logically combine gate control signals generated by the single-loop droop controller to selectively direct the one or more transistors to allow the output current to flow therethrough with the overcurrent signal to present modified gate control signals to the one or more transistors. The logic array is configured to replace one or more of the gate control signals in the modified gate control signals with a gate disable signal responsive to the overcurrent signal presenting the fault signal.

Example Systems

Figure 1:
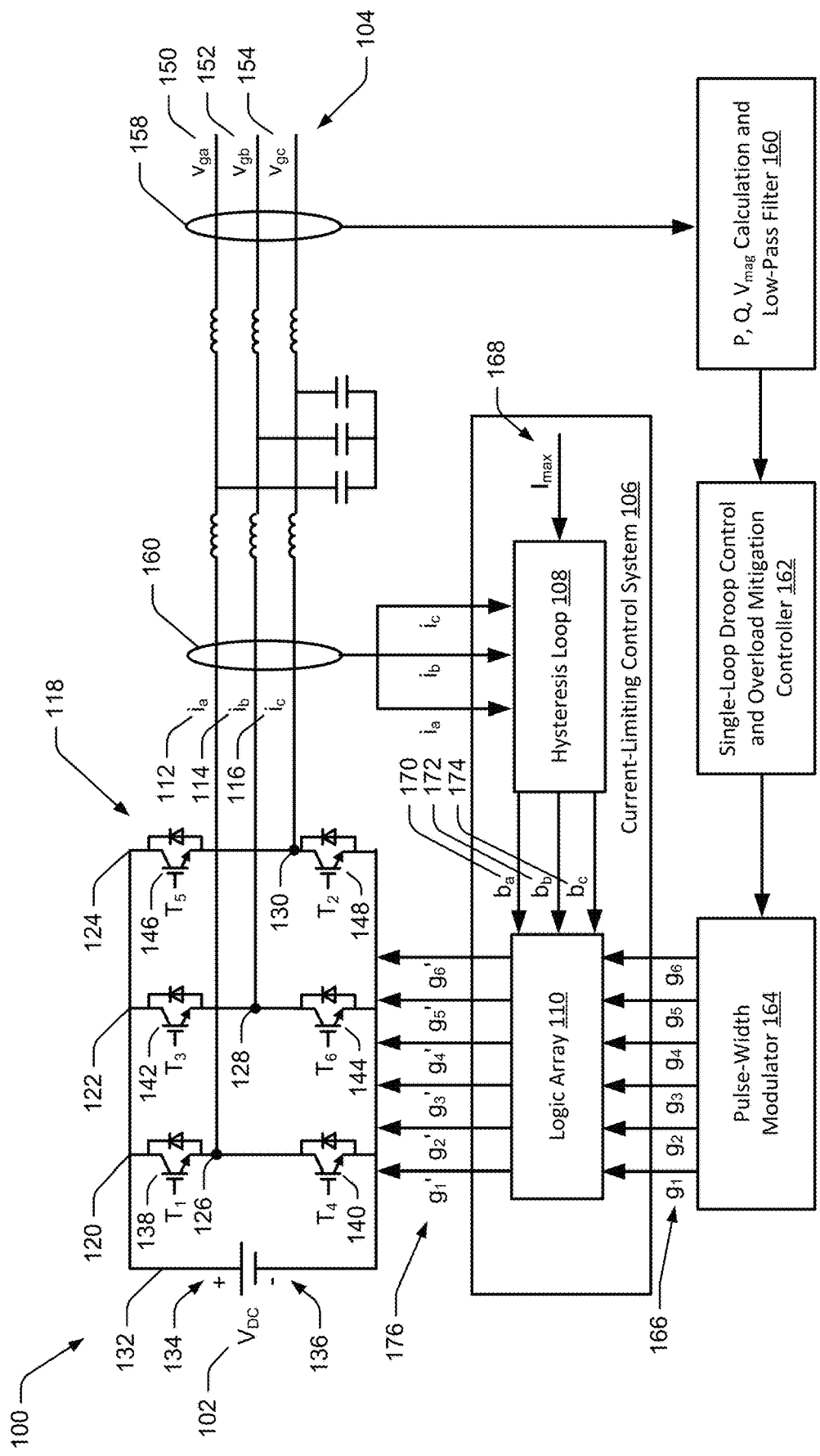
FIG. 1 is a schematic diagram of a single-loop droop-controlled grid forming inverter using an example current-limiting control system.

FIG. 1 illustrates a single-loop droop-controlled grid-forming inverter 100, such as may be used to couple a DC power source (VDc) 102 to a power grid (not shown) at an output 104. The single-loop droop-controlled grid-forming inverter 100 includes an example current-limiting control system 106. The current-limiting control system 106 includes a hysteresis loop 108 and a logic array 110. The hysteresis loop 108 and the logic array 110 are configured to monitor output currents $i_a$ 112, $i_b$ 114, and $i_c$ 116 generated by an inverter 118 to detect and respond to overcurrent situations. An overcurrent situation is a situation in which one or more of the output currents $i_a$ 112, $i_b$ 114, and $i_c$ 116 exceed a maximum current threshold at or beyond which the output current may damage transistors or other components included in the inverter 118. Such conditions may arise, for example, during a short circuit or as a result of a power surge occurring at the DC power source 102 which results in an excessive current or "fault current" flowing in the inverter 118. The current-limiting control system 106 is configured to detect an overcurrent situation by responding to one or more the output currents $i_a$ 112, $i_b$ 114, and $i_c$ 116 exceeding the maximum current threshold and redirecting fault currents before they can cause damage to the components of the inverter 118, as further described below.

The inverter 118, for purposes of this example, is a three-phase bridge inverter of a type commonly used to convert DC power into sinusoidal-wave AC power. The inverter 118 includes three branches 120, 122, and 124, each of which includes an output node 126, 128, 130 at which the output currents $i_a$ 112, $i_b$ 114, and $i_c$ 116, respectively, are presented.

Each of the three branches 120, 122, and 124 includes a pair of transistors coupled to opposing sides of a DC bus 132. A first branch 120 includes a high-side transistor $T_1$ 138 having its collector coupled to the positive side 134 of the DC bus 132 and an emitter coupled to a low-side transistor $T_4$ 140 of which an emitter is coupled to the negative side 136 of the DC bus 132. The first output node 126 lies at the interconnection of the emitter of the high-side transistor $T_1$ 138 and the collector of the low-side transistor $T_4$ 140. A second branch 122 includes a high-side transistor $T_3$ 142 having its collector coupled to the positive side 134 of the DC bus 132 and an emitter coupled to a collector of a low-side transistor $T_6$ 144 of which an emitter is coupled to the negative side 136 of the DC bus 132. The second output node 128 lies at the interconnection of the emitter of the high-side transistor $T_3$ 142 and the collector of the low-side transistor $T_6$ 144. A third branch 124 includes a high-side transistor $T_5$ 146 having its collector coupled to the positive side 134 of the DC bus 132 and an emitter coupled to a collector of a low-side transistor $T_2$ 148 of which an emitter is coupled to the negative side 136 of the DC bus 132. The third output node 130 lies at the interconnection of the emitter of the high-side transistor $T_3$ 146 and the collector of the low-side transistor $T_2$ 148. In various aspects, each of the transistors 138, 140, 142, 144, 146, and 148 includes an insulated-gate bipolar transistor (IGBT) having a high capacity for carrying bipolar current between its collector and emitter.

As further described with reference to FIG. 2, gates of the transistors 138, 140, 142, 144, 146, and 148 of the different branches 120, 122, and 124 are selectively activated to generate the output currents $i_a$ 112, $i_b$ 114, and $i_c$ 116 at the output nodes 126, 128, and 130, respectively, that ultimately generate AC power at voltage outputs $v_{ga}$ 150, $v_{gb}$ 152, and $v_{gc}$ 154 at the output 104. Depending upon gate control signals (further described below) applied to the gates of the transistors 138, 140, 142, 144, 146, and 148, the output currents $i_a$ 112, $i_b$ 114, and $i_c$ 116 flow across one or more of the transistors 138, 140, 142, 144, 146, and 148. An object of the current-limiting control system 106 is to detect when one or more of the output currents $i_a$ 112, $i_b$ 114, and $i_c$ 116 presents a fault current that could damage one or more of the transistors 138, 140, 142, 144, 146, and 148 and then to apply signals to gates of the corresponding one or more of the transistors 138, 140, 142, 144, 146, and 148 to prevent the fault current from damaging the one or more of the transistors 138, 140, 142, 144, 146, and 148.

As is understood by those skilled in droop control, a single-loop droop-controlled grid-forming inverter 100 employs a sensor 158 to monitor the output 104. An instantaneous active power (P), reactive power (Q), and voltage magnitude ($V_{mag}$) calculation and low-pass filter 160 receives data from the sensor 158. An output of the P, Q, and $V_{mag}$ calculation and low-pass filter 160 are presented to a single-loop droop-control and overload mitigation controller 162. In turn, an output of the single-loop droop-control and overload mitigation controller 162 is presented to a pulse-width modulator 164. The pulse-width modulator 164 generates a series of gate control signals 166 (designated $g_1$, $g_2$, $g_3$, $g_4$, $g_5$, and $g_6$ in FIG. 1) that are configured to control the transistors 138, 140, 142, 144, 146, and 148 in the inverter 118 to generate the output currents $i_a$ 112, $i_b$ 114, and $i_c$ 116. The pulse-width modulator 164 may be adapted to generate sinusoidal-wave AC power based on controlling the timing and magnitude of DC pulses presented at the output current nodes 126, 128, and 130. In a conventional single-loop droop-controlled grid-forming inverter (not shown), the gate control signals 166 would be presented directly to the transistors 138, 140, 142, 144, 146, and 148 in the inverter 118.

In various aspects, instead of presenting the gate control signals 166 directly to the transistors 138, 140, 142, 144, 146, and 148 in the inverter 118, the gate control signals 166 are presented to the current-limiting control system 106. The current-limiting control system 106 is coupled with a current sensor 168 configured to monitor the output currents $i_a$ 112, $i_b$ 114, and $i_c$ 116 flowing between the output nodes 126, 128, 130. As described in detail below, the hysteresis loop 108 compares the output currents $i_a$ 112, $i_b$ 114, and $i_c$ 116 with a specified maximum current 170 and generates corresponding overcurrent signals $b_a$ 172, $b_b$ 174, and $b_c$ 176. When the hysteresis loop 108 detects that one or more of the output currents $i_a$ 112, $i_b$ 114, and $i_c$ 116 exceed the specified maximum current 170, the hysteresis loop 108 causes one or more of the overcurrent signals $b_a$ 172, $b_b$ 174, and $b_c$ 176 to present a fault signal.

In various aspects, the logic array 110 receives the gate control signals 166 from the pulse-width modulator 164 and the overcurrent signals $b_a$ 172, $b_b$ 174, and $b_c$ 176 and to logically combine corresponding signals. Responsive to one or more of the overcurrent signals $b_a$ 172, $b_b$ 174, and $b_c$ 176 presenting the fault signal, the logic array 110 replaces one or more of the gate control signals 166 presented by the pulse-width modulator 164 in the modified gate control signals 178 (designated $g_1'$, $g_2'$, $g_3'$, $g_4'$, $g_5'$, and $g_6'$ in FIG. 1) with a gate disable signal. Presentation of the gate disable signal prevents the fault current detected at one or more of the output currents $i_a$ 112, $i_b$ 114, and $i_c$ 116 from flowing through one or more of the transistors 138, 140, 142, 144, 146, and 148. Instead of the fault current flowing through one or more of the transistors 138, 140, 142, 144, 146, and 148, the fault current is redirected, preventing the fault current from damaging one or more of the transistors 138, 140, 142, 144, 146, and 148.

Figure 2:
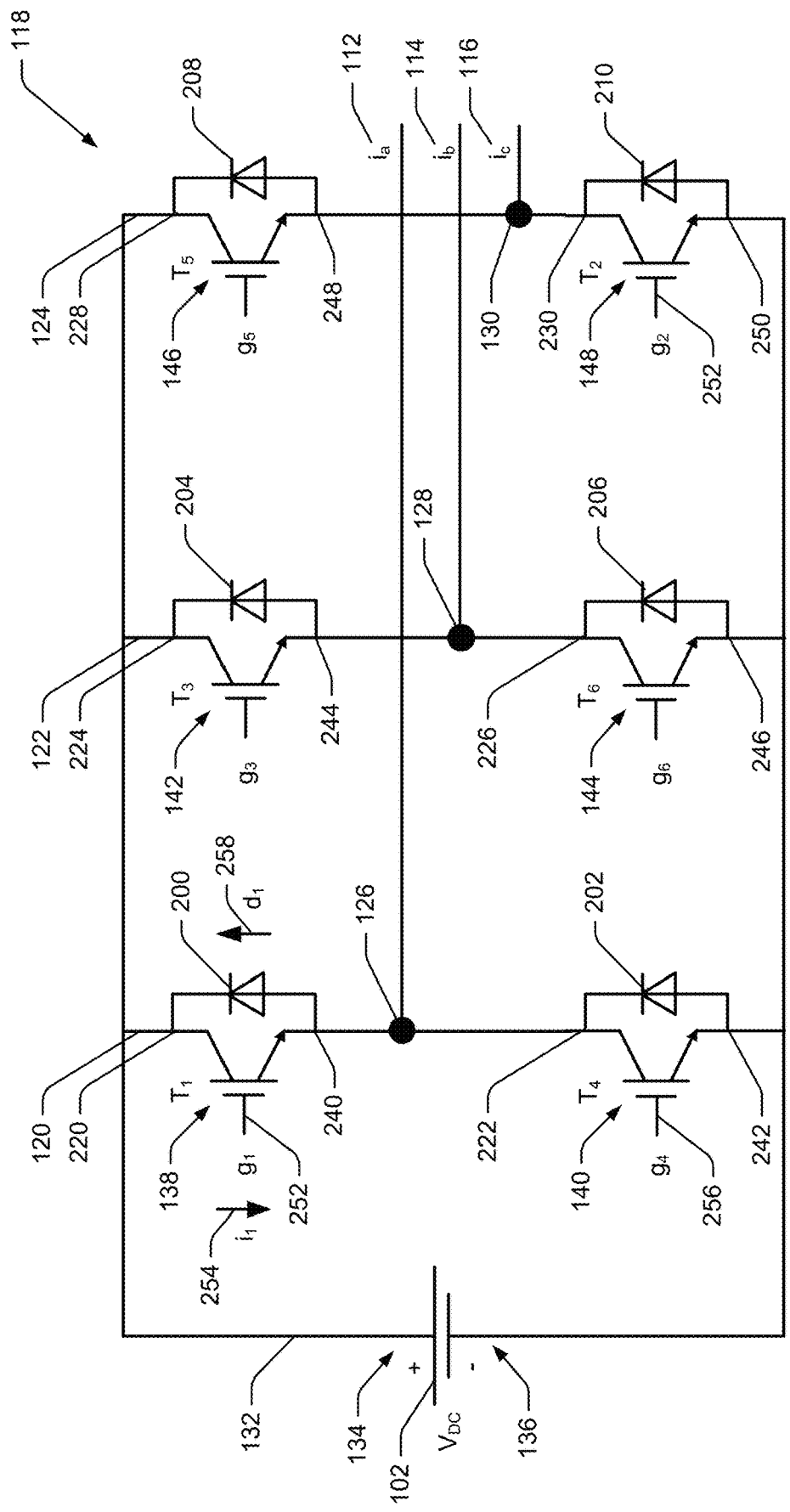
FIG. 2 is an enlarged schematic diagram of an array of transistors configured as an inverter included in the single-loop droop-controlled grid forming inverter of FIG. 1.

Referring to FIG. 2, each of the transistors 138, 140, 142, 144, 146, and 148 of the inverter 118 has a diode 200, 202, 204, 206, 208, and 210, coupled in a blocking configuration between a collector 220, 222, 224, 226, 228, and 230 and an emitter 240, 242, 244, 246, 248, and 250 of each of the transistors 138, 140, 142, 144, 146, and 148, respectively. In this configuration, the anode of each of the diodes 200, 202, 204, 206, 208, and 210 is coupled to the emitter and its cathode is coupled to the collector of its respective transistor 138, 140, 142, 144, 146, and 148, respectively. As a result, each of the diodes 200, 202, 204, 206, 208, and 210 opposes a flow of current around the respective transistors 138, 140, 142, 144, 146, and 148 from the collector 220, 222, 224, 226, 228, 230 to the emitter 240, 242, 244, 246, 248, and 250. However, the diodes 200, 202, 204, 206, 208, 210 permit a flow of current around the respective transistors 138, 140, 142, 144, 146, and 148 from the emitter 240, 242, 244, 246, 248, and 250 to the collector 220, 222, 224, 226, 228, and 230. Thus, as described further below, an excessive current detected across one or more of the transistors 138, 140, 142, 144, 146, and 148 may be redirected to the DC bus 132 where it may be discharged rather than be permitted to flow across one or more of the transistors 138, 140, 142, 144, 146, and 148.

For example, when a gate $g_1$ 252 of the transistor $T_1$ 138 is enabled, a first current $i_1$ 254 applied at the collector 220 of the transistor $T_1$ 138 at the positive side 134 of the DC bus 132 is permitted to through across the transistor $T_1$ 138 to the emitter 240 of the transistor $T_1$ 138. The current $i_1$ 254 is presented at the first output node 126 and also may flow across the transistor $T_4$ 140 (if a gate $g_4$ 256 is enabled). On the other hand, when the gate $g_1$ 252 is disabled, the first current $i_1$ 254 applied at the collector 220 of the transistor $T_1$ 138 at the positive side 134 of the DC bus 132 is prevented from flowing through the transistor $T_1$ 138 to the emitter 240 of the transistor $T_1$ 138. Similarly, when the gate $g_4$ 256 is disabled, a current detected at the output node 126 applied at the collector 230 of the transistor $T_4$ 140 is prevented from flowing through the transistor $T_4$ 140 to the emitter 242 of the transistor $T_4$ 140. Controlling the flow of current through the transistor $T_1$ 138 and/or the transistor $T_4$ 140 (as well as through the transistors 142, 144, 146, and 148) is how the inverter 118, under control of the gate control signals 166 generated by the pulse-width modulator 164 (FIG. 1), generates sinusoidal AC current at the output 104.

Although an IGBT transistor like $T_1$ 138 is rated to accommodate a large bipolar current flowing between the collector 220 and the emitter 240, the transistor $T_1$ 138 may nonetheless be damaged if the current $i_1$ 254 applied at a collector 220 exceeds a specified maximum current for which the transistor $T_1$ 138 is rated. Accordingly, by disabling the gate $g_1$ 212, the current $i_1$ 254 is prevented from flowing through the transistor $T_1$ 138, protecting the transistor $T_1$ 138 from damage. Similarly, by disabling the gate $g_4$ 256, a current at the output node 126 is prevented from flowing through the transistor $T_4$ 140, protecting the transistor $T_4$ 140 from damage. Thus, in response to a current applied across one or more of the transistors 138, 140, 142, 144, 146, and 148, the current-limiting control system 106 disables gates of the respective transistors 138, 140, 142, 144, 146, and 148 to prevent them from being damaged by a fault current in excess of a specified maximum current 170.

In various aspects, when a fault current is detected by the current-limiting control system 106, such as if the current $i_1$ 254 or another current detected at one of the output nodes 126, 128, and/or 130 is determined to be in excess of the specified maximum current 170, the current may be redirected to the DC bus 132. For example, when a gate $g_4$ 256 of the transistor $T_4$ 140 is disabled, a current detected at the output node 126 cannot flow through the transistor $T_4$ 140, but it may flow across the diode 200, as a diode current $d_1$ 258 back to the positive side 134 of the DC bus 132 where the current $d_1$ 258 may dissipate. The fault current may flow "backward" through the DC bus 132 where it may flow from the negative side 136 of the DC bus through the diodes 200, 202, 204, 206, 208, and/or 210 one or more branches 120, 122, and 124 of the inverter 118 until the fault current is dissipated.

Thus, in response to detecting a fault current at one or more of the output nodes 126, 128, and/or 130, the current-limiting control system 106 thus protects the transistors 138, 140, 142, 144, 146, and 148 by disabling gates of the respective transistors 138, 140, 142, 144, 146, and 148 to prevent the fault current from flowing through the respective transistors 138, 140, 142, 144, 146, and 148. The current-limiting control system 106 disables the gates of the affected transistors by replacing the gate control signals 166 generated by the pulse-width modulator 164 with modified gate control signals 178, as further described below with reference to FIG. 3. The fault current is discharged to the DC bus 132 through one or more of the diodes 200, 202, 204, 206, 208, and/or 210. When gates of the respective transistors 138, 140, 142, 144, 146, and/or 148 are reenabled, if the fault current is again detected at one or more of the output nodes 126, 128, and/or 130, gates of the respective transistors 138, 140, 142, 144, 146, and/or 148 are again disabled. The sequence repeats until the fault current is no longer detected at one or more of the output nodes 126, 128, and/or 130.

Figure 3:
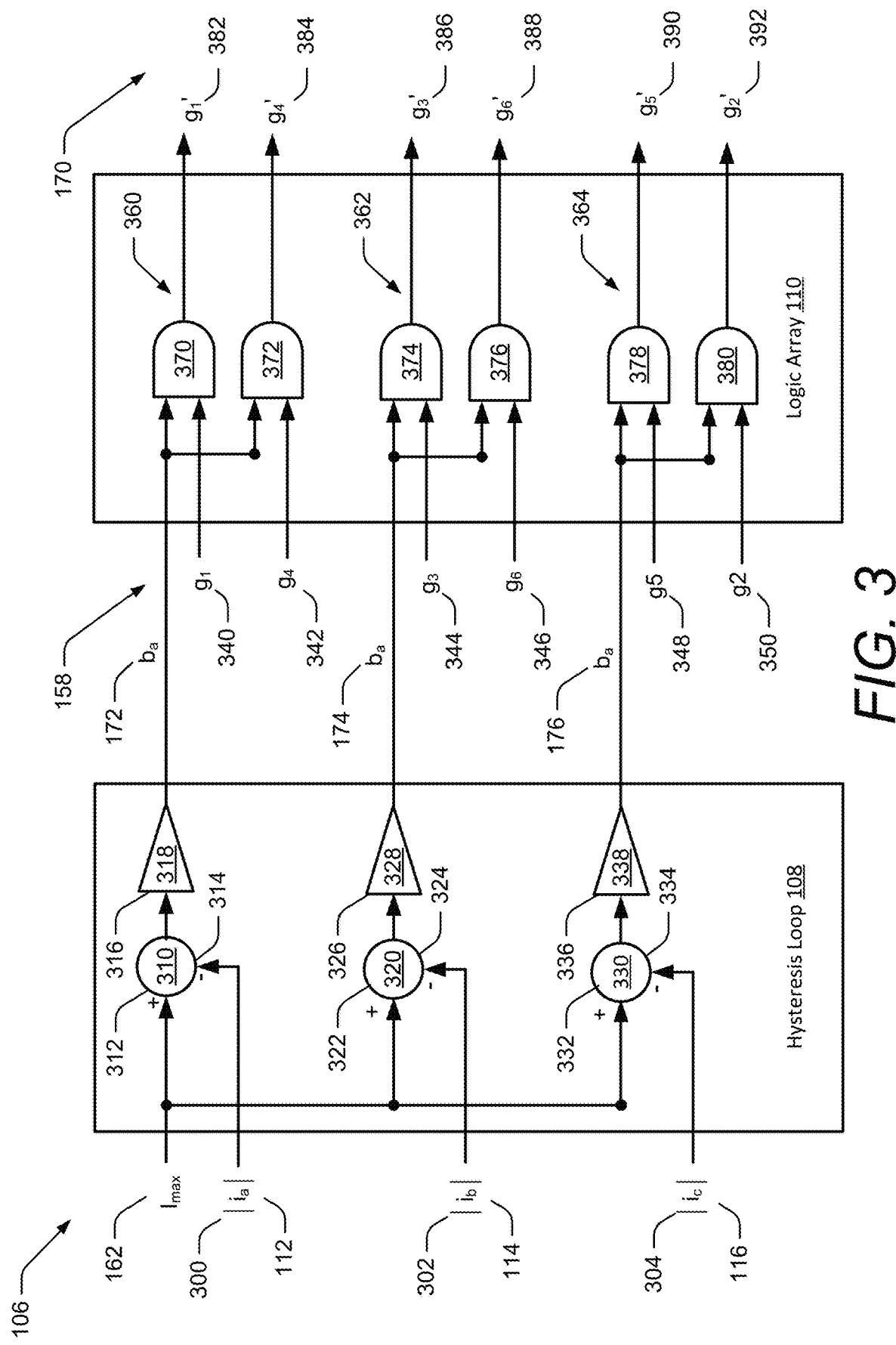
FIG. 3 is a schematic diagram of the current-limiting control system of FIG. 2 including a hysteresis loop and a logic array.

FIG. 3 details an example configuration of the hysteresis loop 108 and the logic array 110 of the current-limiting control system 106. The hysteresis loop 108 receives current magnitudes 300, 302, and 304 of the currents $i_a$ 112, $i_b$ 114, and $i_c$ 116, respectively, and the specified maximum current 170. The respective current magnitudes 300, 302, and 304 and the specified maximum current are supplied to comparators 310, 320, and 330. Specifically, the specified maximum current 170 is presented to positive inputs 312, 322, and 324 of the comparators 310, 320, and 330. Current magnitudes 300, 302, and 304 of the currents $i_a$ 112, $i_b$ 114, and $i_c$ 116 are presented to negative inputs 314, 324, and 334 of the comparators 310, 320, and 330. As long as the specified maximum current 170 is greater than the respective current magnitudes 300, 302, and 304, outputs 316, 326, and 336 of the respective comparators 310, 320, and 330 will be a logical 1 or a high output. By contrast, when the respective current magnitudes 300, 302, and 304 are greater than the specified maximum current 170 is greater than, the outputs 316, 326, and 336 of the respective comparators 310, 320, and 330 will be a logical 0 or a low output. In various aspects, the outputs 316, 326, and 336 are presented to buffers 318, 328, and 338, respectively. Outputs of the buffers $b_a$ 172, $b_b$ 174, and $b_c$ 176 are termed "overcurrent signals" in that the outputs of the buffers $b_a$ 172, $b_b$ 174, and $b_c$ 176 will indicate when one of more of the currents $i_a$ 112, $i_b$ 114, and $i_c$ 116 includes a fault current in excess of the specified maximum current 170.

The overcurrent signals $b_a$ 172, $b_b$ 174, and $b_c$ 176 are presented to the logic array 110 along with the gate control signals 166 generated by the pulse-width modulator 164 (FIG. 1), $g_1$ 340, $g_4$ 342, $g_3$ 344, $g_6$ 346, $g_5$ 348, and $g_2$ 350. The logic array 110 includes three pairs of logic elements 360, 362, and 364. In this example, the pairs of logic elements 360, 362, and 364 include AND gates 370, 372, 374, 376, 378, and 380. At each of the AND gates 370, 372, 374, 376, 378, and 380, one of the overcurrent signals $b_a$ 172, $b_b$ 174, and $b_c$ 176 is logically combined with one of the gate control signals $g_1$ 340, $g_4$ 342, $g_3$ 344, $g_6$ 346, $g_5$ 348, and $g_2$ 350.

Specifically, at a first pair of logic elements 360, the overcurrent signal $b_a$ 172 is logically combined at the AND gate 370 with the gate control signal $g_1$ 340 to generate a modified gate control signal $g_1'$ 382 and the overcurrent signal b a 172 is logically combined at the AND gate 372 with the gate control signal $g_4$ 342 to generate a modified gate control signal $g_4'$ 384. The gate control signal $g_1$ 342 may be paired in the pair of logic elements 360 with the gate control signal $g_4$ 342 to correspond to pairing5 of transistors $T_1$ 138 and $T_4$ 140 in the first branch 120 of the inverter 118 (FIGS. 1 and 2). Similarly, in a second pair of logic elements 362, the overcurrent signal $b_b$ 174 is logically combined at the AND gate 374 with the gate control signal $g_3$ 344 to generate a modified gate control signal $g_3'$ 386 and the overcurrent signal $b_b$ 174 is logically combined at the AND gate 376 with the gate control signal $g_6$ 346 to generate a modified gate control signal $g_6'$ 388. In a third pair of logic elements 364, the overcurrent signal $b_c$ 176 is logically combined at the AND gate 378 with the gate control signal $g_5$ 348 to generate a modified gate control signal $g_5'$ 390 and the overcurrent signal $b_c$ 176 is logically combined at the AND gate 380 with the gate control signal $g_2$ 350 to generate a modified gate control signal $g_2'$ 392.

The logic array 110 thus is responsive to the hysteresis loop 108 to disable gates of transistors with a gate disable signal where a fault current has been detected across the respective transistor. For example, when $i_a$ 112 is identified by the comparator 310 of the hysteresis loop 108 as a fault current, the overcurrent signal b a 172 includes a fault signal, which is a logical 0 or low signal. When combined with the gate control signals $g_1$ 340 and $g_4$ 342 at the AND gates 370 and 372, the modified gate control signals $g_1'$ 382 and $g_4'$ 384 replace the gate control signals $g_1$ 340 and $g_4$ 342 with logical 0 or low gate disable signals to disable gates $g_1$ 252 and $g_4$ 256 of the transistors $T_1$ 138 and $T_4$ 140, respectively. Thus, regardless of the state of the gate control signals $g_1$ 340 and $g_4$ 342 presented by the pulse-width modulator 164, the current-limiting control system 106 will the replace gate control signals $g_1$ 340 and $g_4$ 342 with gate disable signals to disable the gates $g_1$ 252 and $g_4$ 256 of the transistors $T_1$ 138 and $T_4$ 140, respectively. The current-limiting control system 106 thus may prevent the fault current from flowing through—and potentially, damaging—the transistors $T_1$ 138 and $T_4$ 140 or other transistors 142, 144, 146, and 148 of the inverter 118.

Figure 4A:
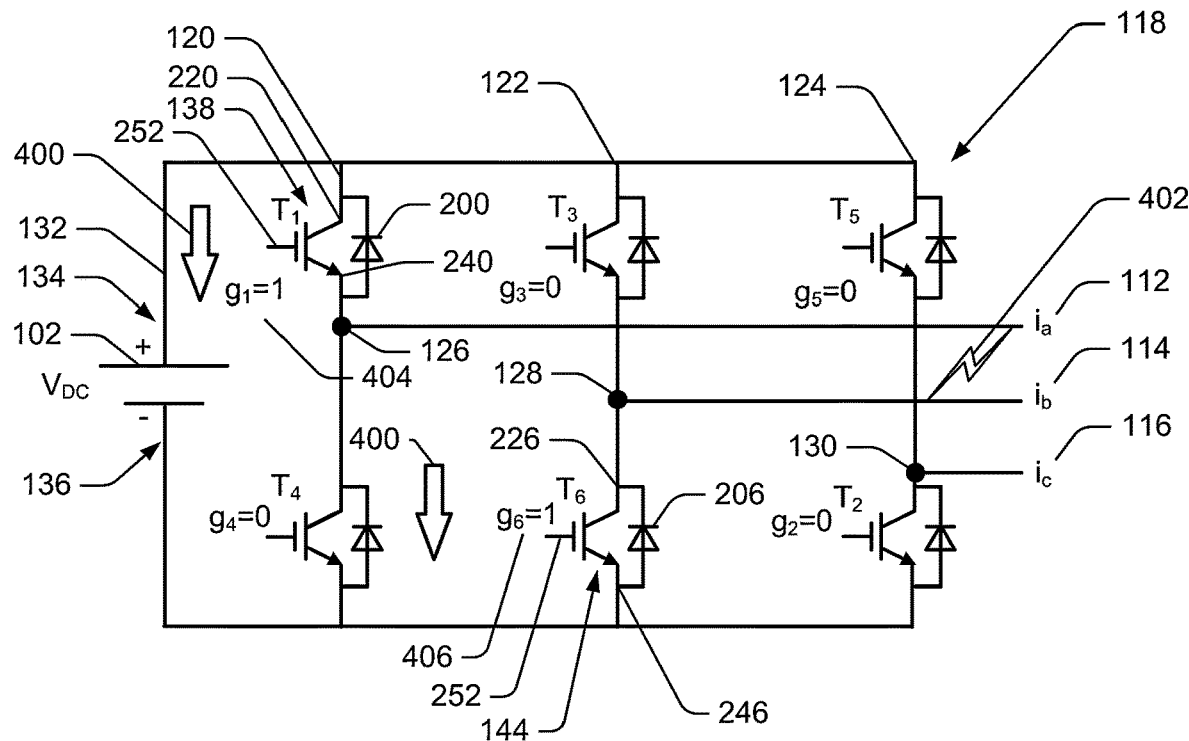
FIG. 4A is a schematic diagram of the inverter of FIG. 2 in an overcurrent situation without engagement of the current-limiting control system.
Figure 4B:
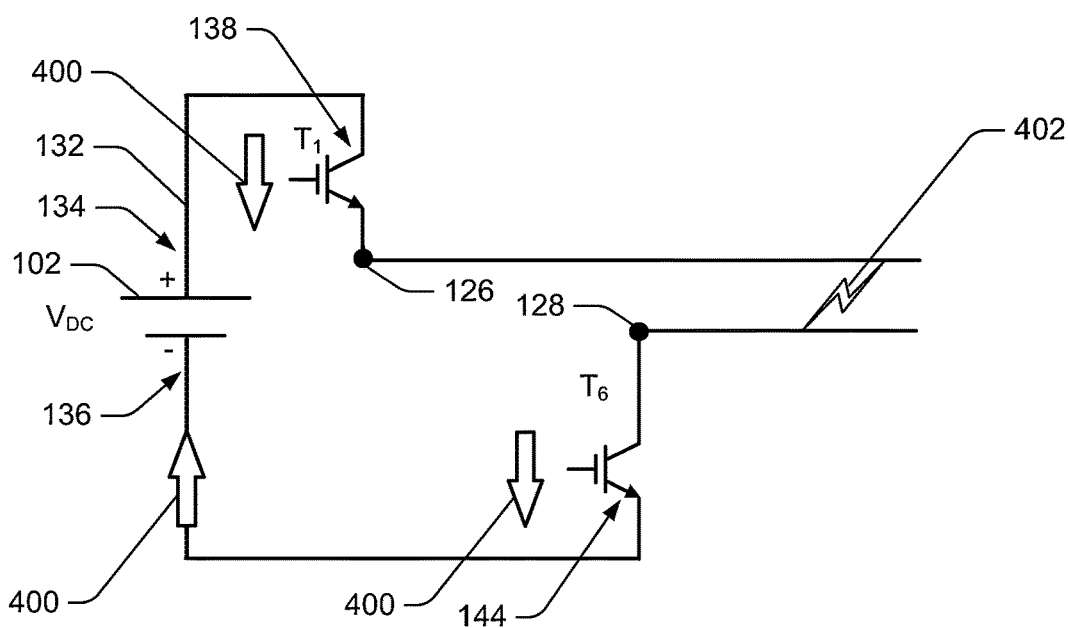
FIG. 4B is a partial schematic diagram of the inverter of FIG. 4A depicting an effect of the overcurrent situation depicted in FIG. 4A.
Figure 5A:
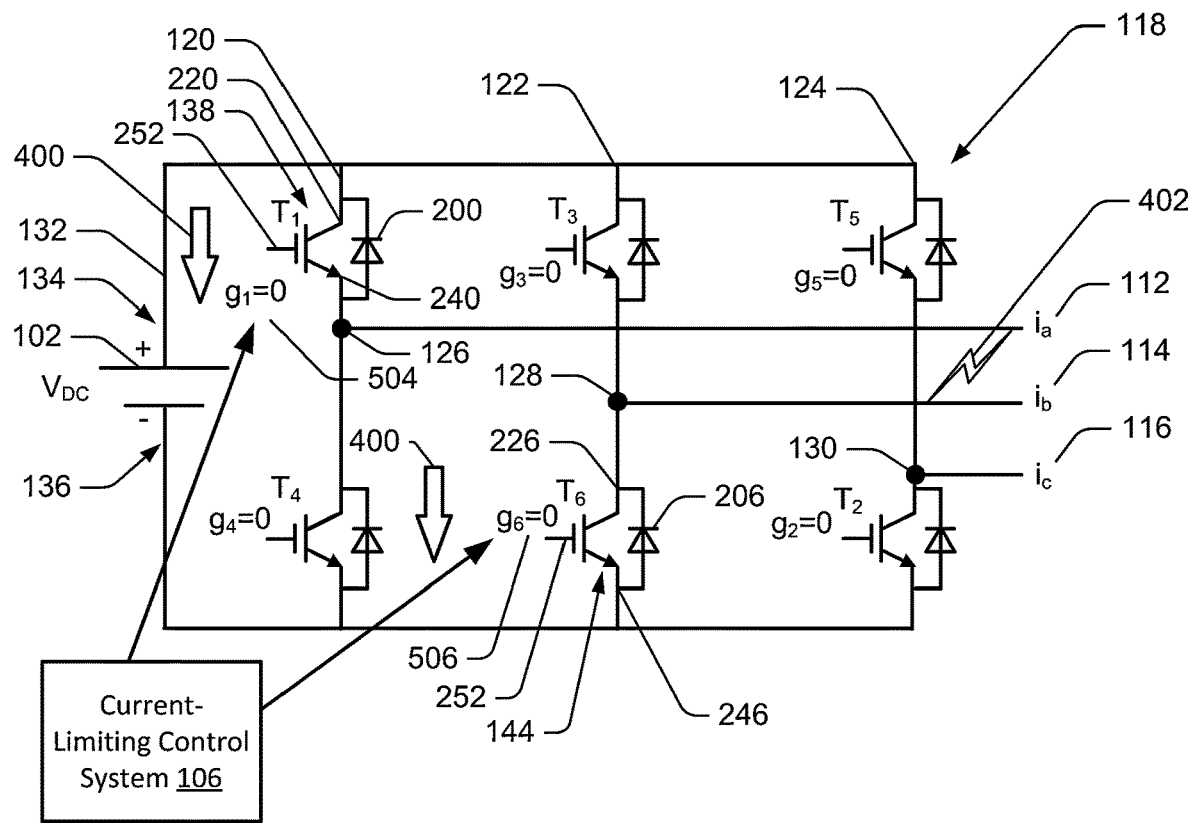
FIG. 5A is a schematic diagram of the inverter of FIG. 2 in an overcurrent situation with the current-limiting control system engaged to respond to the overcurrent situation.
Figure 5B:
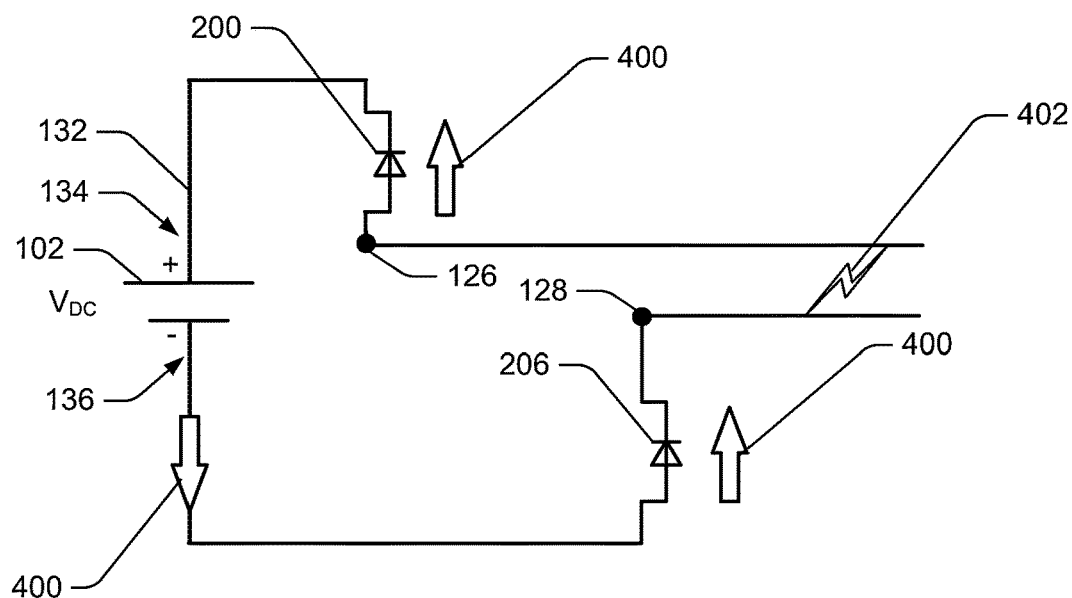
FIG. 5B is a partial schematic diagram of the inverter of FIG. 5A depicting the response of the current-limiting control system to the overcurrent situation.

FIGS. 4A-5B illustrate an example of how implementations of the current-limiting control system 106 may redirect a fault current 400 detected at output node 126 to avoid damage to transistors $T_1$ 138 and $T_4$ 140. Fault currents detected at output nodes 126 and 128 may $b_e$ redirected to avoid damage to transistors 142, 144, 146, and 148 in a similar way. In the example of FIGS. 4A-5B, the fault current 400 is a result of a short circuit 402 between output nodes 126 and 128, although this is just one example of a cause of a fault current. FIGS. 4A and 4B illustrate a case in which the current-limiting control system 106 is not engaged with the inverter 118 to respond to the fault current 400. FIGS. 5A and 5B illustrate a case in which the current-limiting control system 106 is engaged with the inverter 118 to respond to the fault current 400.

Referring to FIG. 4A, when the short circuit 402 causes the fault current 400 to $b_e$ presented, the gate control signals 166 presented by the pulse-width modulator 164 (not shown in FIGS. 4A-5B) include an active gate control signal $g_1$=1 404 to enable the gate $g_1$ 252 of transistor $T_1$ 138 to conduct current between the collector 220 and the emitter 240 and an active gate control signal $g_6$=1 406 to enable a gate $g_6$ 404 52 of transistor $T_6$ 144 to conduct current between the collector 226 and the emitter 246. As a result, referring to FIG. 4B, the fault current 400 flows through the short circuit 402 through the transistors $T_1$ 138 and $T_6$ 144. The fault current 400, being in excess of the specified maximum current 170 for which the transistors $T_1$ 138 and $T_6$ 144 are rated, may potentially damage the transistors $T_1$ 138 and $T_6$ 144 and damage the inverter 118.

However, the current-limiting control system 106 may prevent the short circuit 402 from causing damage to the transistors $T_1$ 138 and $T_6$ 144. Referring to FIG. 5A, responsive to detecting the fault current 400 across the transistors $T_1$ 138 and $T_6$ 144, as described with reference to FIG. 3, the current-limiting control system 106 replaces the active gate control signals $g_1$=1 404 and $g_6$=1 406 of the transistors $T_1$ 138 and $T_6$ 144 with gate disable signals $g_1$=0 504 and $g_6$=0 506, respectively. As a result, the transistors $T_1$ 138 and $T_6$ 144 no longer conduct the fault current 400 and the fault current 400 flows through the diodes 200 and 206 across the collectors 220 and 226 and emitters 240 and 246 of the transistors $T_1$ 138 and $T_6$ 144, respectively. The redirected fault current 400 flows back onto the DC bus 132 where it is dissipated instead of flowing through— and potentially damaging—the transistors $T_1$ 138 and $T_6$ 144.

Figures 6, 7:
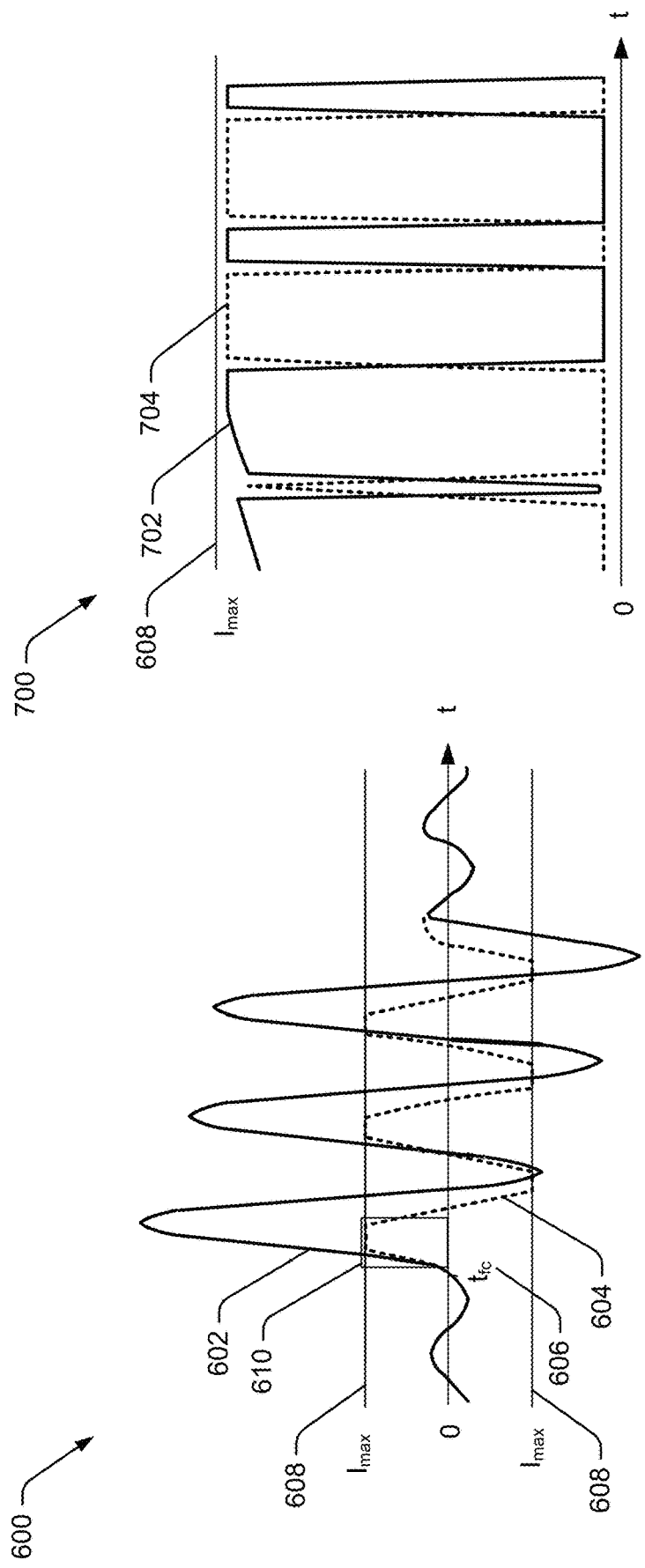
FIG. 6 is a composite graph of an output current in an overcurrent situation in the single-loop droop-controlled grid forming inverter with and without response of the current-limiting control system.
FIG. 7 is a graph of the output current in the overcurrent situation depicted in FIG. 6 depicting an effect of the current-limiting control system redirecting the output current.

FIG. 6 is a graph 600 comparing a plot of a current 602 detected across a plurality of transistors in an overcurrent situation with a plot of a modified current 604 constrained by the current-limiting control system 106. At a time the fault current 602 is detected, $t_f$ 606, the current 602 exceeds a specified maximum current value 608 at numerous points and, thus, presents a fault current. By contrast, the modified current 604 is contained within a range bounded by the specified maximum current 608 by the current-limiting control system 106. As previously described, when the current-limiting control system 106 detects a current that exceeds the specified maximum current value 608, the current-limiting control system 106 disables one or more of the transistors to cut off the flow of current through the transistors and redirects the excessive, fault current back across the DC bus 132 (see FIGS. 5A and 5B) until the fault current is dissipated. Thus, the current-limiting control system 106 prevents the current 602 from flowing through the transistors and other components when the current 602 exceeds a specified maximum current value 608 and, thus, may cause damage to components through which the current passes.

FIG. 7 is a graph 700 of an enlarged region 610 (FIG. 6) of the plot of current 602. As previously described, upon detecting a current in excess of the specified maximum current value 608, the current-limiting control system 106 disables gates of one or more transistors through which the fault current would flow and redirects the fault current back to the DC bus. Thus, a plot of current flowing through the one or more affected transistors 702 is cut off at or around a level of the specified maximum current value 608. Then, as described with reference to FIGS. 5A and 5B, a redirected current 704, redirected through one or more diodes such as diodes 200 and 206, may circulate back through the DC bus 132. If the redirected current 704 results in an output current across one or more of the transistors that exceeds the specified maximum current value 608, that current also will be constrained by disabling the transistors through which the redirected current 704 flows until the redirected current dissipates. Thus, by disabling transistors across which a fault current is applied to redirect the fault current, then by continuing to rapidly enable and disable other transistors in response to whether the fault current is detected across the respective transistors, the current-limiting control system 106 repeatedly redirects the fault current to the DC bus until the fault current is dissipated.

Example Method

FIG. 8 is a flow diagram of an example method 800 for limiting current across one or more transistors in a grid-forming inverter controlled by a single-loop droop controller as previously described with reference to FIGS. 1-7. At a block 802, a plurality of gate control signals are generated, the gate control signals being applicable to a plurality of transistors in the grid-forming inverter to cause the grid-forming inverter to generate a plurality of output currents combinable to form an alternating current. As described with reference to FIG. 1, a pulse-width modulator 164 may be used to generate gate control signals configured to enable the plurality of transistors to generate DC currents that may be combined to form a sinusoidal AC current. At a block 804, a specified maximum current is compared with the plurality of output currents to generate an overcurrent signal. The overcurrent signal presents a fault signal responsive to one of the plurality of output currents $i_a$ 112, $i_b$ 114, and/or $i_c$ 116, flowing through at least one of the transistors 138, 140, 142, 144, 146, and/or 148 and detectable at one of the output nodes 126, 128, and 130, exceeding the specified maximum current 170. At a block 806, upon the fault signal being presented, one or more of the gate control signals 166 is replaced with a gate disable signal. At a block 808, the gate disable signal is applied to the at least one of the transistors 138, 140, 142, 144, 146, and/or 148 to prevent the output current $i_a$ 112, $i_b$ 114, and/or $i_c$ 116 from flowing through the at least one of the transistors 138, 140, 142, 144, 146, and/or 148.

This document describes systems and techniques for a current-limiting control strategy for single-loop droop-controlled grid-forming inverters. These systems and techniques may be realized using one or more of the entities or components shown in FIGS. 1-5B and used as described with reference to the example method of FIG. 8. However, the figures illustrate only some of the many possible systems capable of employing the described techniques.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Additional Examples

Some additional examples of systems and techniques for a current-limiting control strategy for single-loop droop-controlled grid-forming inverters are as follows:

Example 1. A current-limiting control system for a single-loop droop controller comprising: a hysteresis module configured to compare an output current detected across one or more transistors in an inverter controlled by the single-loop droop converter with a specified maximum current and to generate an overcurrent signal, the overcurrent signal presenting a fault signal responsive to the output current exceeding the specified maximum current; and a logic array configured to logically combine gate control signals generated by the single-loop droop controller to selectively direct the one or more transistors to allow the output current to flow therethrough with the overcurrent signal to present modified gate control signals to the one or more transistors, the logic array being configured to replace one or more of the gate control signals in the modified gate control signals with a gate disable signal responsive to the overcurrent signal presenting the fault signal.

Example 2. The current-limiting control system of Example 1, wherein the hysteresis module includes a plurality of comparators, each of the comparators being configured to compare one of a plurality of output currents detected at a plurality of output nodes of the inverter with the specified maximum current and to present the fault signal responsive to the one of the plurality of output currents exceeding the specified maximum current.

Example 3. The current-limiting control system of Example 2, wherein each of the plurality of comparators in the hysteresis module is coupled with a buffer configured to maintain an output of the comparator.

Example 4. The current-limiting control system of Example 1, wherein the one or more transistors includes a high-side transistor in a first branch of the inverter coupled between a positive side of a direct current bus and a first output node and a low-side transistor in a second branch of the inverter and coupled between a second output node and a negative side of the direct current bus, and wherein the output current is detected between the first output node and the second output node.

Example 5. The current-limiting control system of Example 4, wherein the logic array includes a plurality of logic elements configured to replace the gate control signals with the gate disable signal in the modified gate control signals presented to the high-side transistor and the low-side transistor to prevent the output current from flowing through the high-side transistor and low-side transistor when the fault signal is presented.

Example 6. The current-limiting control system of Example 5, wherein the plurality of logic elements includes a plurality of AND gates configured to replace one or more of the gate control signals with the gate disable signal in the modified gate control signals presented to the high-side transistor and the low-side transistor when the fault signal is presented to prevent the output current from flowing through the high-side transistor and the low-side transistor.

Example 7. The current-limiting control system of Example 4, wherein the inverter is configured to redirect the output current to the direct current bus responsive to the gate disable signal being applied to the one or more transistors.

Example 8. The current-limiting control system of Example 7, further comprising a plurality of diodes, each of the diodes being coupled between an emitter and a collector of each of the one or more transistors wherein the output current is redirected through the diodes to the direct current bus.

Example 9. The current-limiting control system of Example 1, wherein the one or more transistors in an inverter include insulated-gate bipolar transistors.

Example 10. A grid-forming inverter comprising: an inverter including a plurality of transistors configured in a three-phase bridge; a single-loop droop controller configured to monitor a plurality of output currents from the inverter and to generate a plurality of gate control signals applicable to the plurality of transistors to selectively direct the plurality of transistors to allow the output current to flow therethrough; and a current-limiting control system including: a hysteresis module configured to compare an output current detected across one or more transistors in an inverter controlled by the single-loop droop converter with a specified maximum current and to generate an overcurrent signal, the overcurrent signal presenting a fault signal responsive to the output current exceeding the specified maximum current; and a logic array configured to logically combine the plurality of gate control signals with the overcurrent signal to present modified gate control signals to the one or more transistors, the logic array being configured to replace one or more of the gate control signals in the modified gate control signals with a gate disable signal responsive to the overcurrent signal presenting the fault signal to prevent the output current from flowing through the one or more transistors.

Example 11. The grid-forming inverter of Example 10, wherein the hysteresis module includes a plurality of comparators, each of the comparators being configured to compare one of a plurality of output currents detected at a plurality of output nodes of the inverter with the specified maximum current and to present the fault signal responsive to the one of the plurality of output currents exceeding the specified maximum current.

Example 12. The grid-forming inverter of Example 10, wherein the one or more transistors includes a high-side transistor in a first branch of the inverter coupled between a positive side of a direct current bus and a first output node and a low-side transistor in a second branch of the inverter and coupled between a second output node and a negative side of the direct current bus, and wherein the output current is detected between the first output node and the second output node.

Example 13. The grid-forming inverter of Example 12, wherein the logic array includes a plurality of logic elements configured to replace the gate control signals with the gate disable signal in the modified gate control signals presented to the high-side transistor and the low-side transistor to prevent the output current from flowing through the high-side transistor and low-side transistor when the fault signal is presented.

Example 14. The grid-forming inverter of Example 13, wherein the plurality of logic elements includes a plurality of AND gates configured to replace one or more of the gate control signals with the gate disable signal in the modified gate control signals presented to the high-side transistor and the low-side transistor when the fault signal is presented to prevent the output current from flowing through the high-side transistor and the low-side transistor.

Example 15. The grid-forming inverter of Example 12, wherein the inverter is configured, responsive to the gate disable signal being applied to the one or more transistors, to redirect the output current to the direct current bus.

Example 16. The grid-forming inverter of Example 15, further comprising a plurality of diodes, each of the diodes being coupled between an emitter and a collector of each of the one or more transistors wherein the output current is redirected through the diodes to the direct current bus.

Example 17. The grid-forming inverter of Example 10, wherein the one or more transistors in an inverter include insulated-gate bipolar transistors.

Example 18. A method of limiting current across one or more transistors in a grid-forming inverter controlled by a single-loop droop controller comprising: generating a plurality of gate control signals applicable to a plurality of transistors in the grid-forming inverter to cause the grid-forming inverter to generate a plurality of output currents combinable to form an alternating current; comparing a specified maximum current with the plurality of output currents to generate an overcurrent signal, the overcurrent signal presenting a fault signal responsive to one of the plurality of output currents flowing through at least one of the transistors exceeding the specified maximum current; replacing one or more of the gate control signals with a gate disable signal responsive to the fault signal being presented; and applying the gate disable signal to the at least one of the transistors to prevent the output current from flowing through the at least one of the transistors.

Example 19. The method of Example 18, further comprising logically combining the overcurrent signal with the one or more gate control signals at a plurality of AND gates configured to replace one or more of the gate control signals with the gate disable signal responsive to the fault signal being presented by the overcurrent signal.

Example 20. The method of Example 18, further comprising preventing the output current from flowing through the at least one of the transistors by redirecting the output current to a direct current bus to which the plurality of transistors is coupled.

CONCLUSION

Although implementations of systems and techniques for a current-limiting control strategy for single-loop droop-controlled grid-forming inverters have been described in language specific to certain features and/or methods, the subject of the appended claims is not necessarily limited to the specific features or methods described. Rather, the specific features and methods are disclosed as example implementations of systems and techniques for a current-limiting control strategy for single-loop droop-controlled grid-forming inverters.

What is claimed is:

1. A current-limiting control system for a single-loop droop controller comprising:
   a hysteresis module configured to compare an output current detected across one or more transistors in an inverter controlled by the single-loop droop converter with a specified maximum current and to generate an overcurrent signal, the overcurrent signal presenting a fault signal responsive to the output current exceeding the specified maximum current; and
   a logic array configured to logically combine gate control signals generated by the single-loop droop controller to selectively direct the one or more transistors to allow the output current to flow therethrough with the overcurrent signal to present modified gate control signals to the one or more transistors, the logic array being configured to replace one or more of the gate control signals in the modified gate control signals with a gate disable signal responsive to the overcurrent signal presenting the fault signal.

2. The current-limiting control system of claim 1, wherein the hysteresis module includes a plurality of comparators, each of the comparators being configured to compare one of a plurality of output currents detected at a plurality of output nodes of the inverter with the specified maximum current and to present the fault signal responsive to the one of the plurality of output currents exceeding the specified maximum current.

3. The current-limiting control system of claim 2, wherein each of the plurality of comparators in the hysteresis module is coupled with a buffer configured to maintain an output of the comparator.

4. The current-limiting control system of claim 1, wherein the one or more transistors includes a high-side transistor in a first branch of the inverter coupled between a positive side of a direct current bus and a first output node and a low-side transistor in a second branch of the inverter and coupled between a second output node and a negative side of the direct current bus, and wherein the output current is detected between the first output node and the second output node.

5. The current-limiting control system of claim 4, wherein the logic array includes a plurality of logic elements configured to replace the gate control signals with the gate disable signal in the modified gate control signals presented to the high-side transistor and the low-side transistor to prevent the output current from flowing through the high-side transistor and low-side transistor when the fault signal is presented.

6. The current-limiting control system of claim 5, wherein the plurality of logic elements includes a plurality of AND gates configured to replace one or more of the gate control signals with the gate disable signal in the modified gate control signals presented to the high-side transistor and the low-side transistor when the fault signal is presented to prevent the output current from flowing through the high-side transistor and the low-side transistor.

7. The current-limiting control system of claim 4, wherein the inverter is configured to redirect the output current to the direct current bus responsive to the gate disable signal being applied to the one or more transistors.

8. The current-limiting control system of claim 7, further comprising a plurality of diodes, each of the diodes being coupled between an emitter and a collector of each of the one or more transistors, wherein the output current is redirected through the diodes to the direct current bus.

9. The current-limiting control system of claim 1, wherein the one or more transistors in an inverter include insulated-gate bipolar transistors.

10. A grid-forming inverter comprising:
    an inverter including a plurality of transistors configured in a three-phase bridge;
    a single-loop droop controller configured to monitor a plurality of output currents from the inverter and to generate a plurality of gate control signals applicable to the plurality of transistors to selectively direct the plurality of transistors to allow the output current to flow therethrough; and
    a current-limiting control system including:
       a hysteresis module configured to compare an output current detected across one or more transistors in an inverter controlled by the single-loop droop converter with a specified maximum current and to generate an overcurrent signal, the overcurrent signal presenting a fault signal responsive to the output current exceeding the specified maximum current; and
       a logic array configured to logically combine the plurality of gate control signals with the overcurrent signal to present modified gate control signals to the one or more transistors, the logic array being configured to replace one or more of the gate control signals in the modified gate control signals with a gate disable signal responsive to the overcurrent signal presenting the fault signal to prevent the output current from flowing through the one or more transistors.

11. The grid-forming inverter of claim 10, wherein the hysteresis module includes a plurality of comparators, each of the comparators being configured to compare one of a plurality of output currents detected at a plurality of output nodes of the inverter with the specified maximum current and to present the fault signal responsive to the one of the plurality of output currents exceeding the specified maximum current.

12. The grid-forming inverter of claim 10, wherein the one or more transistors includes a high-side transistor in a first branch of the inverter coupled between a positive side of a direct current bus and a first output node and a low-side transistor in a second branch of the inverter and coupled between a second output node and a negative side of the direct current bus, and wherein the output current is detected between the first output node and the second output node.

13. The grid-forming inverter of claim 12, wherein the logic array includes a plurality of logic elements configured to replace the gate control signals with the gate disable signal in the modified gate control signals presented to the high-side transistor and the low-side transistor to prevent the output current from flowing through the high-side transistor and low-side transistor when the fault signal is presented.

14. The grid-forming inverter of claim 13, wherein the plurality of logic elements includes a plurality of AND gates configured to replace one or more of the gate control signals with the gate disable signal in the modified gate control signals presented to the high-side transistor and the low-side transistor when the fault signal is presented to prevent the output current from flowing through the high-side transistor and the low-side transistor.

15. The grid-forming inverter of claim 12, wherein the inverter is configured, responsive to the gate disable signal being applied to the one or more transistors, to redirect the output current to the direct current bus.

16. The grid-forming inverter of claim 15, further comprising a plurality of diodes, each of the diodes being coupled between an emitter and a collector of each of the one or more transistors wherein the output current is redirected through the diodes to the direct current bus.

17. The grid-forming inverter of claim 10, wherein the one or more transistors in an inverter include insulated-gate bipolar transistors.

18. A method of limiting current across one or more transistors in a grid-forming inverter controlled by a single-loop droop controller comprising:
generating a plurality of gate control signals applicable to a plurality of transistors in the grid-forming inverter to cause the grid-forming inverter to generate a plurality of output currents combinable to form an alternating current;
comparing a specified maximum current with the plurality of output currents to generate an overcurrent signal, the overcurrent signal presenting a fault signal responsive to one of the plurality of output currents flowing through at least one of the transistors exceeding the specified maximum current;
replacing one or more of the gate control signals with a gate disable signal responsive to the fault signal being presented; and
applying the gate disable signal to the at least one of the transistors to prevent the output current from flowing through the at least one of the transistors.

19. The method of claim 18, further comprising logically combining the overcurrent signal with the one or more gate control signals at a plurality of AND gates configured to replace one or more of the gate control signals with the gate disable signal responsive to the fault signal being presented by the overcurrent signal.

20. The method of claim 18, further comprising preventing the output current from flowing through the at least one of the transistors by redirecting the output current to a direct current bus to which the plurality of transistors is coupled.

* * * * *